Oct. 15, 1957     C. R. HOLLIS     2,809,569
BAG VALVING AND SLEEVING MACHINE
Filed Nov. 26, 1954     9 Sheets-Sheet 1
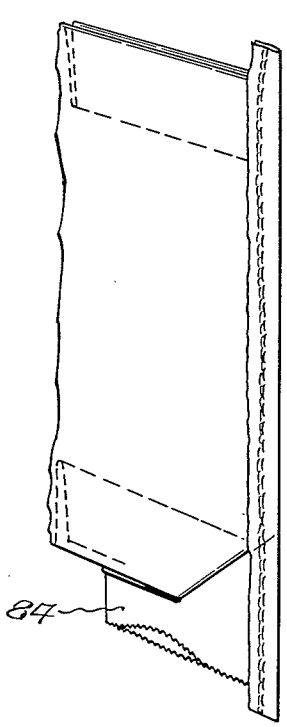
Fig. 1.
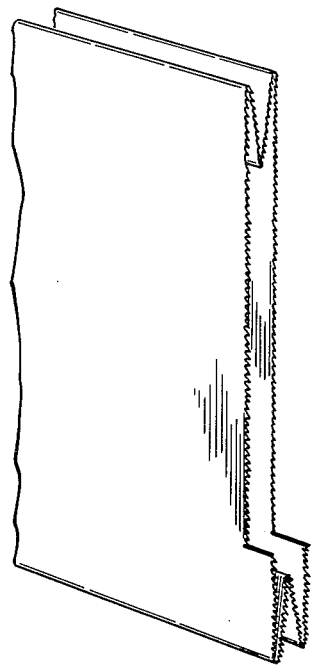
Fig. 2.
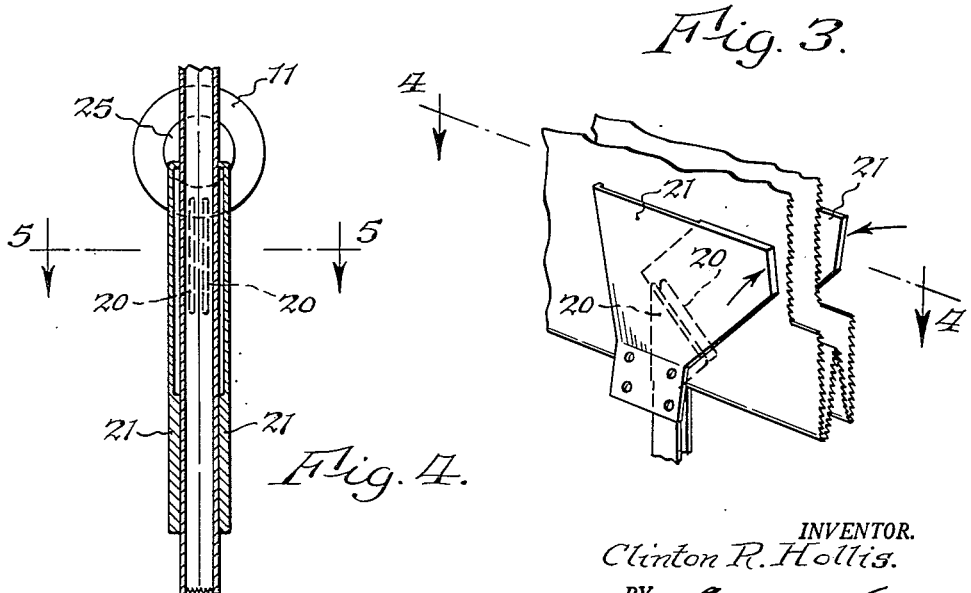
INVENTOR.
Clinton R. Hollis.
BY Thomas E. Tate
Agent.

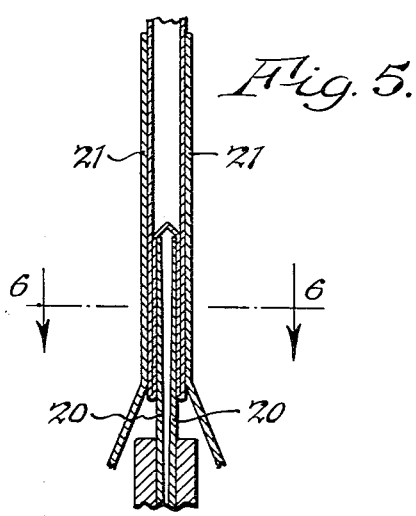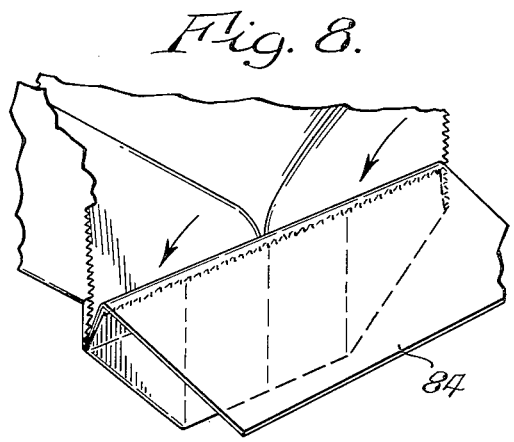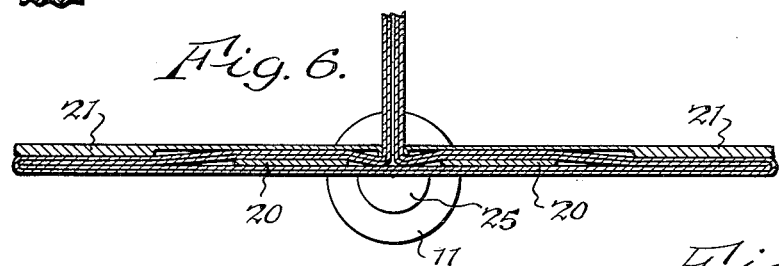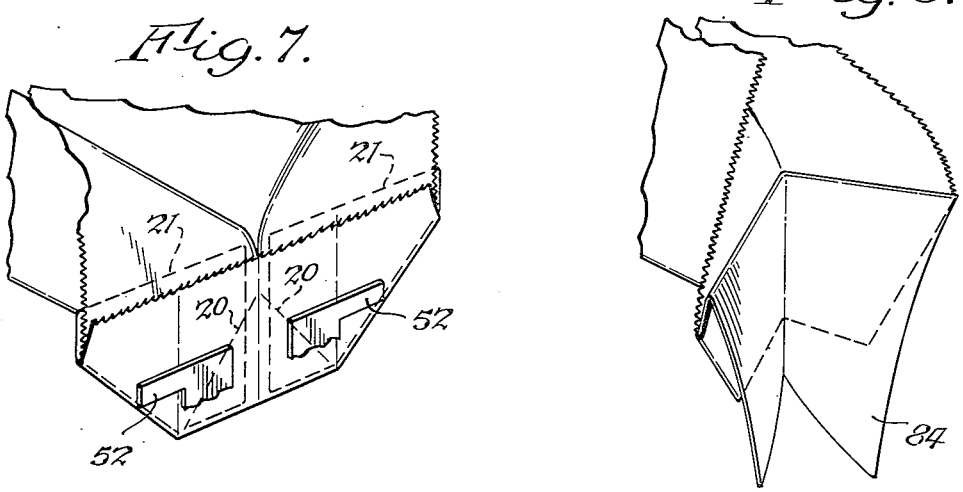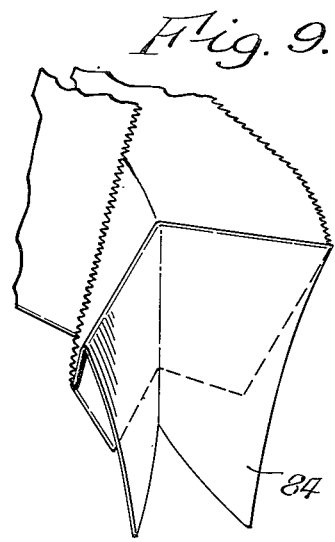

Oct. 15, 1957 C. R. HOLLIS 2,809,569
BAG VALVING AND SLEEVING MACHINE
Filed Nov. 26, 1954 9 Sheets-Sheet 3

INVENTOR.
Clinton R. Hollis.
BY
Thomas E. Tate
Agent.

INVENTOR.
Clinton R. Hollis.
BY
Thomas E. Tate
Agent.

Oct. 15, 1957  C. R. HOLLIS  2,809,569
BAG VALVING AND SLEEVING MACHINE
Filed Nov. 26, 1954  9 Sheets-Sheet 6
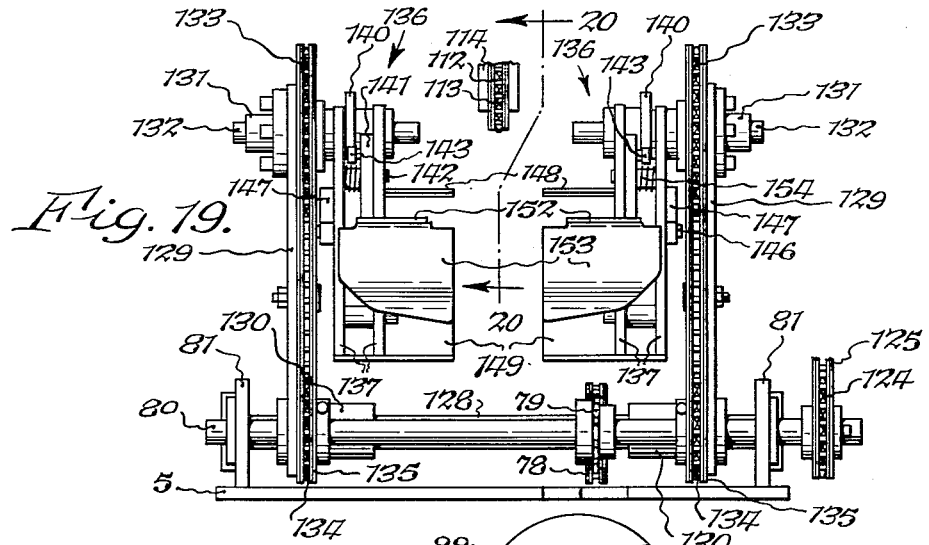
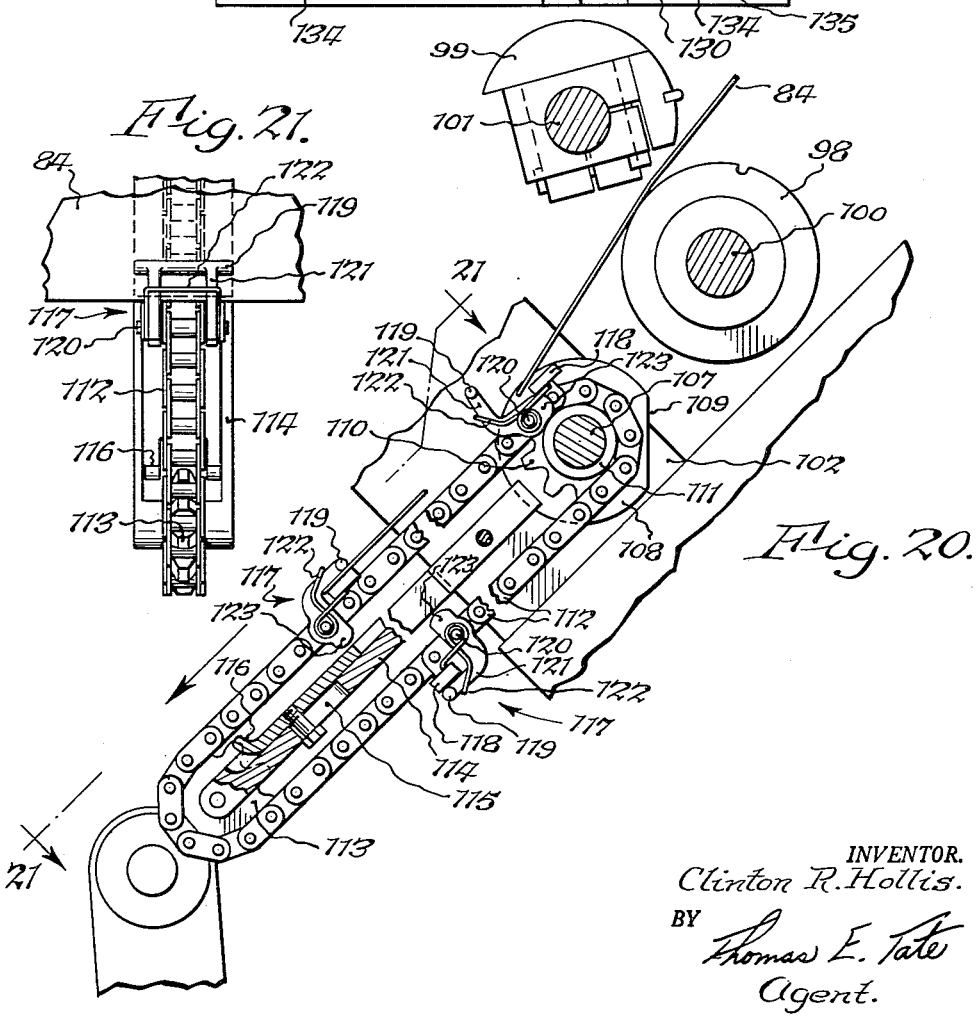
INVENTOR.
Clinton R. Hollis.
BY Thomas E. Tate
Agent.

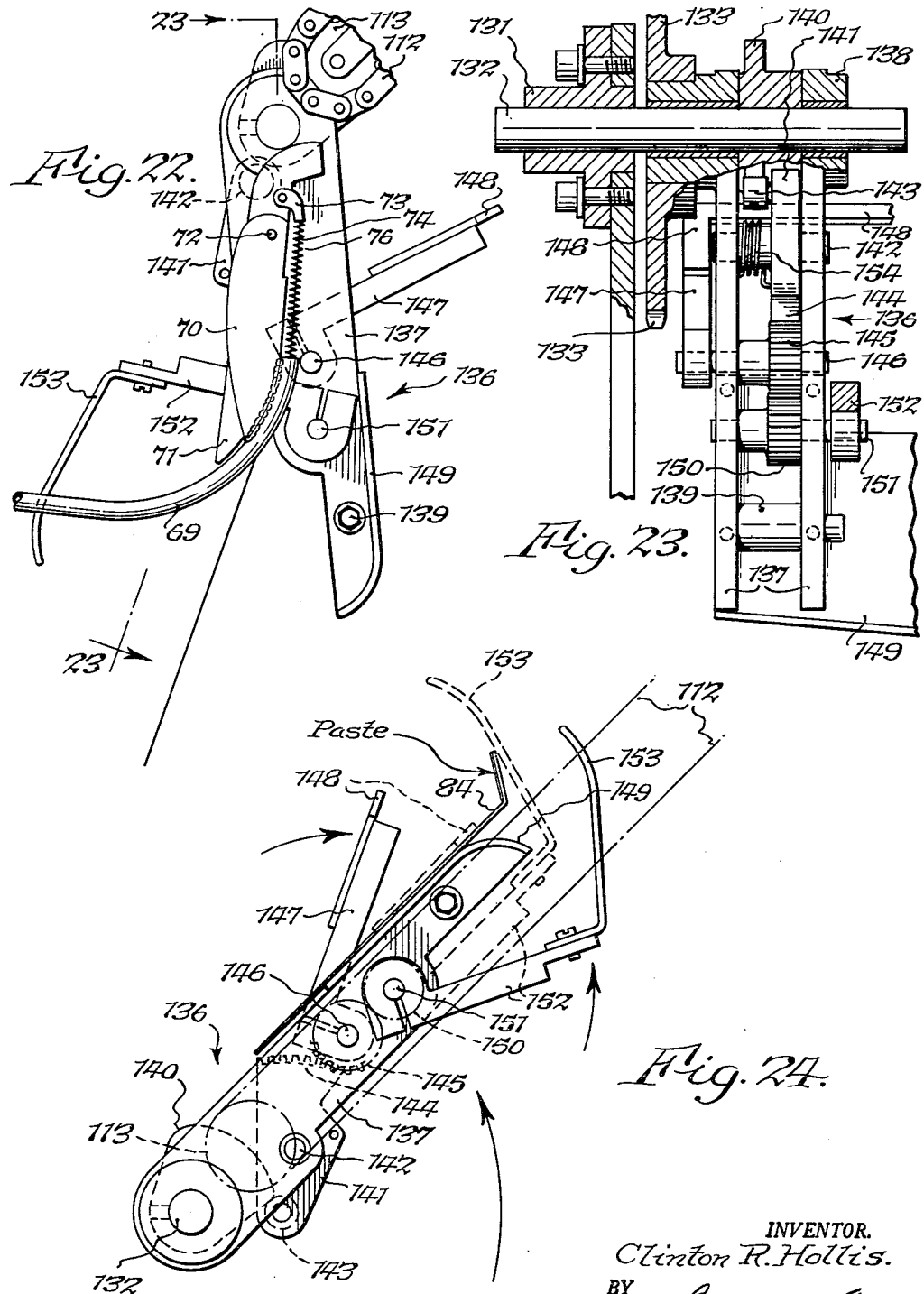

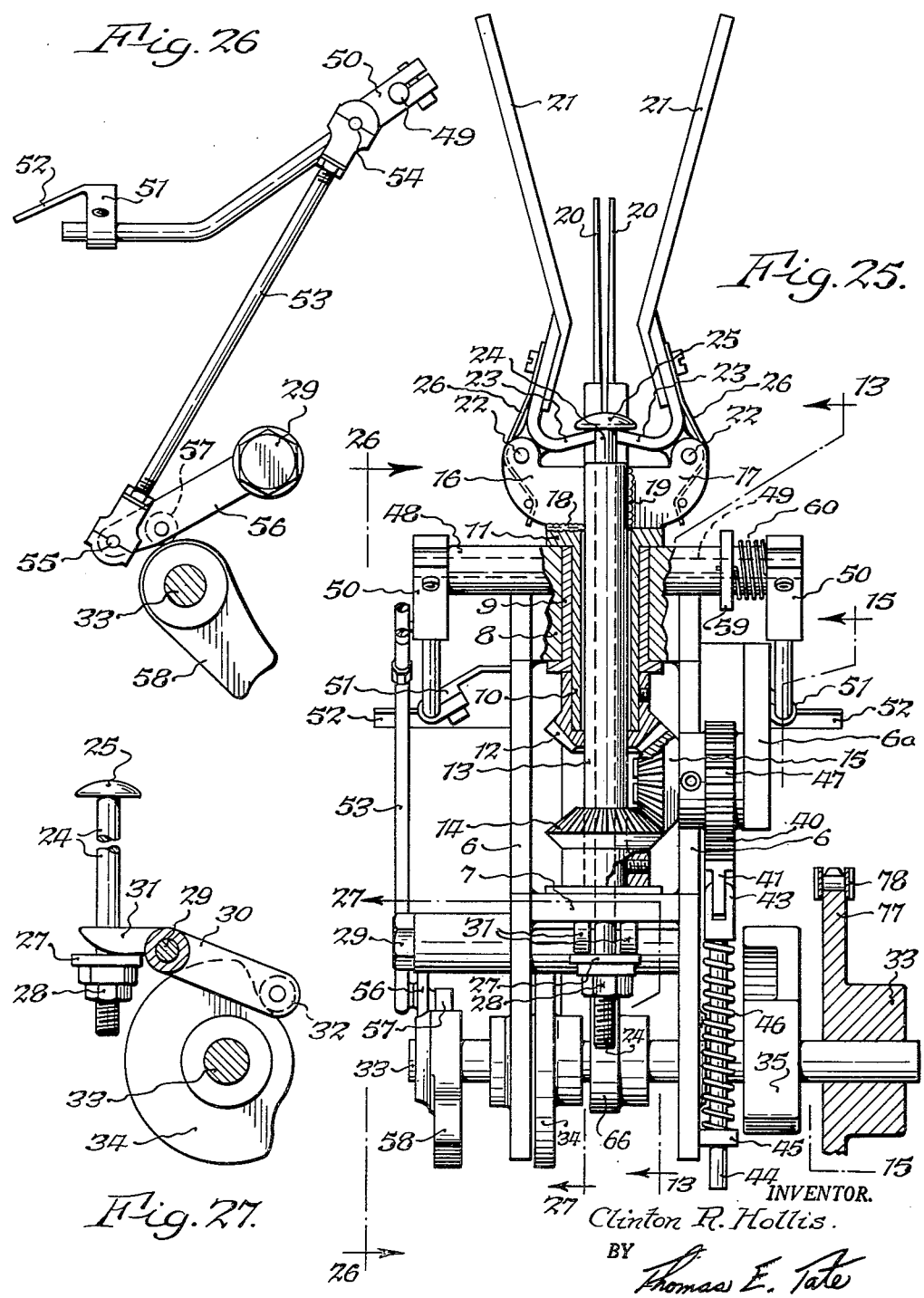

Oct. 15, 1957 — C. R. HOLLIS — 2,809,569
BAG VALVING AND SLEEVING MACHINE
Filed Nov. 26, 1954 — 9 Sheets-Sheet 9
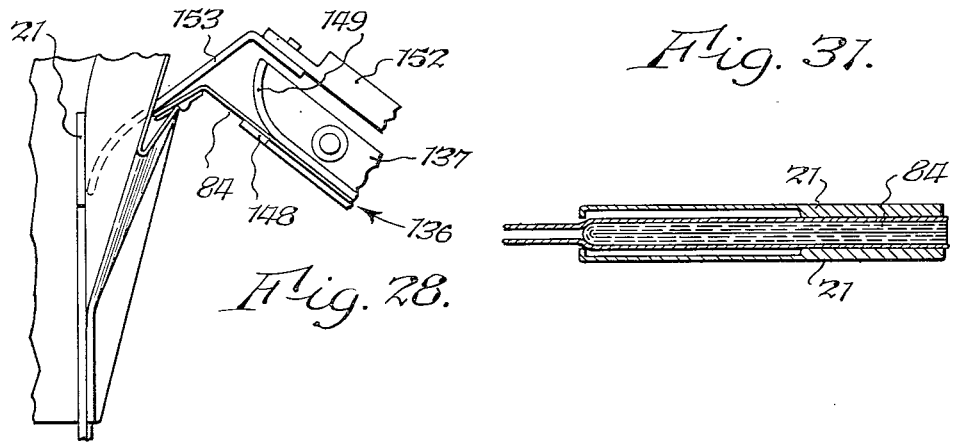
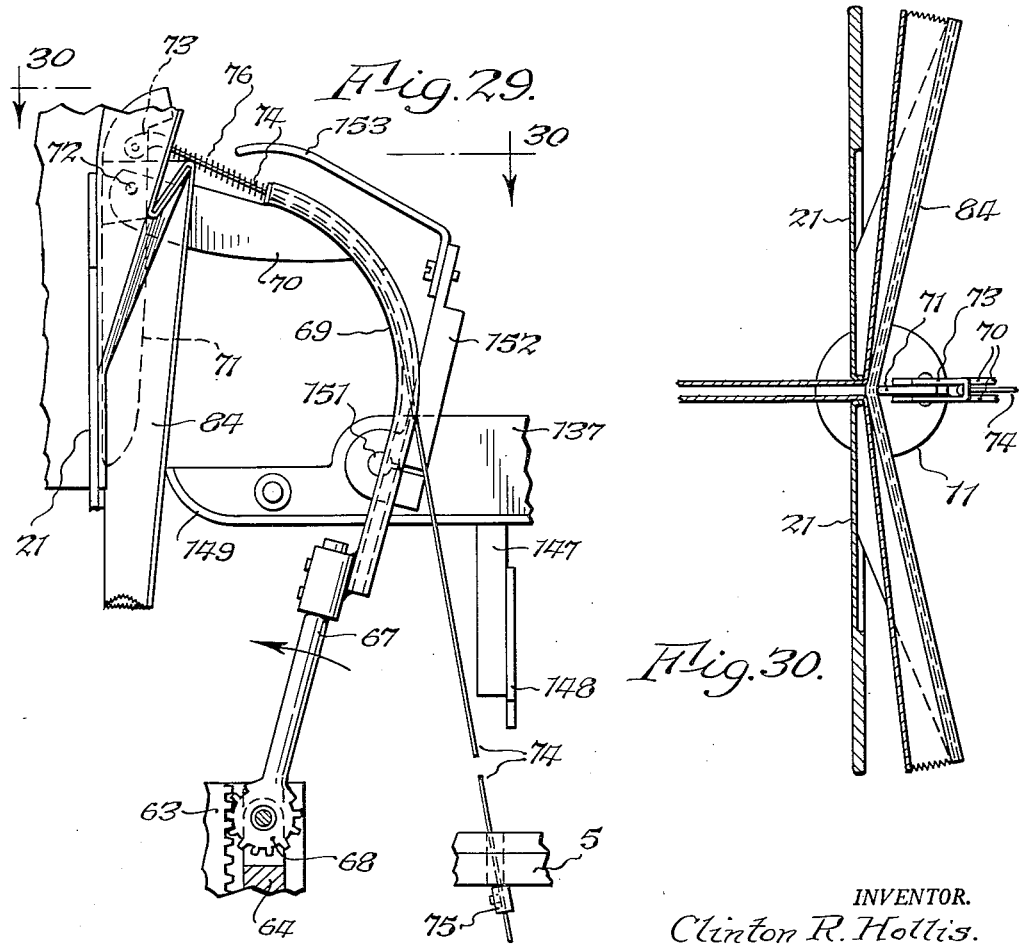
INVENTOR.
Clinton R. Hollis.
BY Thomas E. Tate
Agent.

United States Patent Office 2,809,569
Patented Oct. 15, 1957

2,809,569

BAG VALVING AND SLEEVING MACHINE

Clinton R. Hollis, Camden, Ark., assignor to International Paper Company, New York, N. Y., a corporation of New York Application November 26, 1954, Serial No. 471,181

11 Claims. (Cl. 93—8)

This invention relates to new and useful improvements in bagmaking machinery generally, and particularly seeks to provide novel mechanisms for performing valving and sleeving operations on multi-wall paper valve bags.

In applying a so-called tuck-in sleeve to a gusseted multi-wall blank for a valve bag it is necessary to open the gusset and bag walls in the area of the valve so that opposite sides become disposed 180° apart and the valve is flattened out into substantially a single plane. Following the opening of the valve in this manner the leading edge of the sleeve blank which has been previously glued on its underside is inserted between the valve lip and the wall portions of the bag lying immediately therebehind, and the remainder of the sleeve blank is folded downwardly over the valve lip into juxtaposition with the flattened valve. The valve is then closed which results in the sleeve being medially creased, and the bag is then ready to have its valve end closed as by a line of sewing spaced inwardly from the tube end but substantially parallel thereto.

Manual application of these sleeves is obviously uneconomical for several reasons including slowness of the sleeving operation, the necessity of pre-cutting and stacking the sleeve blanks, the necessity of individually glueing the lead edge of each sleeve blank and the necessity of preforming and re-opening the valve prior to insertion of the sleeve.

Many efforts have heretofore been made to perform this valving and sleeving operation automatically, but none has been satisfactory because the mechanisms thereof could not keep the sleeves under full control as they were being inserted behind the valve lips or because the sleeves would become displaced when the valves were folded into their closed position.

A machine constructed in accordance with this invention, however, overcomes the deficiencies of the earlier machines and provides a machine for automatically valving and sleeving muti-wall bags in such a manner that the sleeves are always kept under perfect control during such operations.

Therefore, an object of this invention is to provide novel apparatus for supporting an individual valve bag tube, opening and flattening the valve preparatory to receiving a tuck-in sleeve, withdrawing, creasing, glueing and cutting successive sleeve blanks from a supply roll of paper therefor and individually applying the sleeves to successively presented bag tubes.

Another object of this invention is to provide a machine of the character stated in which means are provided to transversely crease each sleeve blank before it engages the upstanding lip of the flattened valve in order substantially to reduce the degree of folding necessary to bring the main portion of the sleeve into face to face contact with the flattened valve and to provide a shoulder or flange on the sleeve which engages the valve lip and prevents misalignment of the sleeve as it is being applied to the valve.

A further object of this invention is to provide a machine of the character stated in which presser means are temporarily held against the flattened valve lip as the sleeve is being inserted therebehind whereby to maintain the valve lip in its flattened position during initial insertion of the sleeve.

A further object of this invention is to provide a machine of the character stated which is simple in design, rugged in construction and economical to manufacture.

With these and other objects in view, the nature of which will be more apparent, the invention will be more fully understood by reference to the drawings, the accompanying detailed description and the appended claims.

In the drawings,

Fig. 1 is a perspective view of a completed multi-wall valve bag provided with a tuck-in sleeve;

Fig. 2 is a perspective view of the valve end of a multiply bag tube prior to valving and sleeving;

Fig. 3 is a perspective view of the valve corner of the bag tube as it is positioned in the machine at the start of valving and sleeving operations;

Fig. 4 is a horizontal section taken along line 4—4 of Fig. 3;

Fig. 5 is a vertical, transverse section taken along line 5—5 of Fig. 4;

Fig. 6 is a horizontal section taken along line 6—6 of Fig. 5, showing the parts in their position as the bag tube is opened to flatten the valve;

Fig. 7 is a fragmentary perspective of the valve corner of the bag when it has been opened in a manner corresponding to Fig. 6;

Fig. 8 is a fragmentary perspective of the flattened valve corner as the lead edge of a sleeve is being inserted behind the valve lip;

Fig. 9 is a perspective similar to Fig. 8 and shows the partial closing of the valve after the sleeve has been medially creased;

Fig. 19 is a front elevation of a portion of the mechanism and is taken along line 19—19 of Fig. 16;

Fig. 20 is a vertical section taken along line 20—20 of Fig. 19;

Fig. 21 is a plan view of the mechanism shown in Fig. 20 and is taken along line 21—21 thereof;

Fig. 22 is a view similar to Fig. 20 but shows mechanisms positioned below the lower end of the endless sleeve-feed chain;

Fig. 23 is a transverse section taken along line 23—23 of Fig. 22;

Fig. 24 is a view of the same parts shown in Fig. 22 but with the parts in different positions;

Fig. 25 is an enlarged front elevational view taken along line 25—25 of Fig. 18;

Fig. 26 is a fragmentary side elevation taken along line 26—26 of Fig. 25;

Fig. 27 is a fragmentary section taken along line 27—27 of Fig. 25;

Fig. 28 is an enlarged fragmentary, detailed side elevation showing the bag valve just as the sleeve begins to be inserted;

Fig. 29 is a view similar to Fig. 28 but shows the position of the parts after the sleeve has been inserted over the valve lip and medially creased;

Fig. 30 is a horizontal section taken along line 30—30 of Fig. 29; and

Fig. 31 is a horizontal section similar to Fig. 30, but shows the sleeved valve in its closed position.

Valving mechanism

Figure 13:
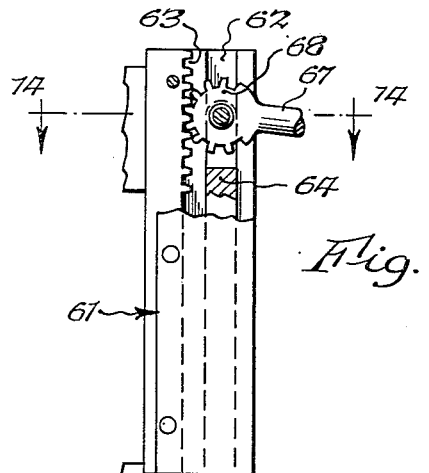
Fig. 13 is a fragmentary vertical section taken along line 13—13 of Fig. 25.
Figure 10:
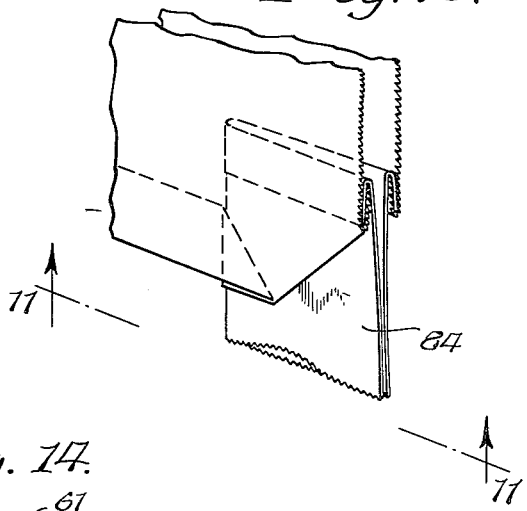
Fig. 10 is a view similar to Fig. 9 and shows the bag corner after the valving and sleeving has been completed.

Referring to the drawings in detail, the invention as illustrated is embodied in a machine for automatically valving and sleeving multi-wall paper bags and includes a base 5 carrying at one end a pair of upwardly directed, spaced parallel frame members 6, 6 having a transverse brace 7 extending therebetween. A block 8 (see Fig. 25) is affixed between the upper ends of the frame members 6 and is provided with a centrally disposed vertical bore carrying a bushing 9. A sleeve 10 having an upper flange 11 is rotatably carried within the bushing 9 and has its lower end projecting therebelow and to which is affixed a bevel gear 12. A hollow shaft or sleeve 13 is rotatably carried within the sleeve 10 and is of such a length that both ends project substantially beyond the ends of the sleeve 10. A bevel gear 14 is affixed to the lower end of the sleeve 13 immediately above the transverse brace 7 and is operably connected to the bevel gear 12 by an intermediate bevel gear 15 journalled in a frame element 6a carried by one of the frame members 6.

A pair of symmetrically opposed yokes 16 and 17 are positioned over the top of the flange 11 of the sleeve 10, and the yoke 16 is rigidly affixed thereto as by welding indicated at 18. The yoke 17 is rigidly affixed to the upper end of the sleeve 13 as by welding indicated at 19.

A pair of relatively small triangular shaped up-standing gusset clamp plates 20, 20 are respectively carried by the yokes 16 and 17. A pair of wing plates 21, 21 are each pivotally connected to the yokes 16 and 17 as by longitudinally aligned, horizontal pivots 22. The lower ends of the wing plates 21 are provided with lug extensions 23 directed towards each other and of a dimension such that their ends overlie the sleeve 13.

A pull rod 24 having a flanged head 25 extends downwardly through the sleeve 13 and extends a substantial distance below the transverse frame brace 7 through which it passes. It will be noted that the head 25 of the pull rod 24 overlies the ends of the lugs 23 so that if the rod 24 were to be pushed downwardly the wings 21, 21 would be moved toward each other. In order that the lugs 23 may be maintained in constant contact with the rod head 25, leaf springs 26 are operably connected between the wings 21 and the supporting yokes 16 and 17 to constantly tend to bias the wings 21 apart.

The lower end of the pull rod 24 carries a plate 27 adjustably retained thereon as by a nut 28 threadably engaged with the lower end of the pull rod. A rock shaft 29 (see Fig. 27) carries a rock arm 30 having one end bifurcated as at 31 and the other end provided with a roller cam follower 32. The bifurcated end of the rock arm spans the pull rod 24 and has its lower edges in contact with the plate 27.

A cam shaft 33 is journalled in the frame members 6 adjacent the lower ends thereof and has affixed thereto a cam 34 which oscillates the rock arm 30 through the roller cam follower 32. Thus as the cam follower 32 hits a lift portion of the cam 34 the pull rod 24 will be pulled downwardly and the clamp wings 21 will be brought towards each other. Conversely, when the cam follower 32 hits a drop portion of the cam 34 the pull rod 24 will be permitted to rise under the influence of the wing-biasing springs 26 to permit the clamp wings 21 to become separated.

Figure 15:
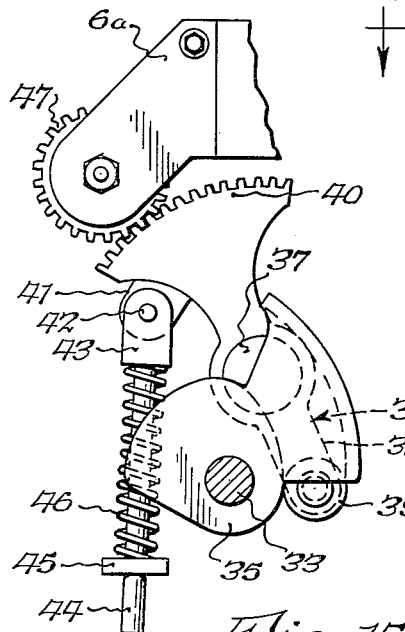
Fig. 15 is a fragmentary vertical section taken along line 15—15 of Fig. 25.
Figure 11:
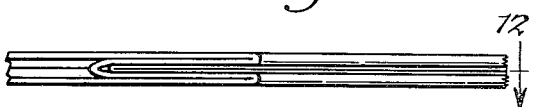
Fig. 11 is a bottom plan view of the valved corner of the bag taken along line 11—11 of Fig. 10.
Figure 12:
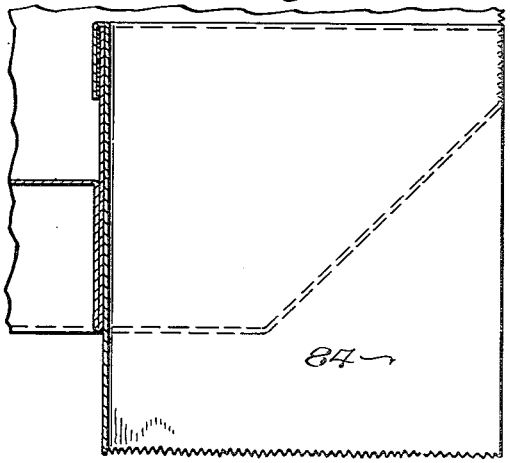
Fig. 12 is a vertical section taken along line 12—12 of Fig. 11.

The gusset clamps 20 and the wings 21 are oscillated about the vertical axis of the sleeves 10 and 13 under the control of a cam 35 (see Fig. 15) affixed to the shaft 33. A rock arm generally indicated at 36 is pivotally connected as at 37 to one of the frame members 6 and includes a lower depending arm 38 which carries a roller cam follower 39 which is maintained in contact with the cam 35. The upper end of the rock arm 36 terminates in a gear sector 40 and a depending lug 41 which is pivotally connected as at 42 to a clevis 43 affixed to the upper end of a rod 44 which is vertically slidable in a lug 45 affixed to the lower end of the adjacent frame member 6. A compression spring 46 surrounds the rod 44 and extends between the lug 45 and the clevis 43 and is affected to constantly tend to rotate the rock arm 36 in a clockwise direction as viewed in Fig. 15 in order to maintain continuous contact between the cam 35 and the cam follower 39. A pinion gear 47 rotates with the intermediate bevel gear 15 and meshes with the gear sector 40. From the foregoing it will be seen that rotation of the cam 35 will effect oscillation of the gear sector 40 and through the bevel gears 15, 14 and 12 will effect oscillation of the gusset clamp plates 20 and the wings 21, as mentioned hereinabove.

Figure 14:
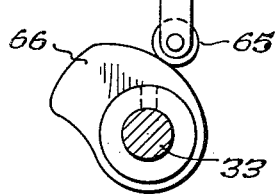
Fig. 14 is a horizontal section taken along line 14—14 of Fig. 13.

As will be seen in Figs. 25 and 26 of the drawings, the block 8 is provided with a transversely extending bearing boss 48 which carries a rock shaft 49 having its ends projecting therebeyond and to which is clamped a pair of rock arms 50, 50. A bar 51 extends across the rock arms 50 adjacent the outer ends thereof and is provided with a pair of outwardly extending valve flap presser plates 52, 52 which assist in maintaining the lower portion of the valve flap in a flattened condition during insertion of the sleeve, as will be hereinafter more fully described. A link 53 has its upper end pivotally connected as at 54 to one of the rock arms 50 and its lower end pivotally connected as at 55 to the outer end of a rock arm 56 carried by the rock shaft 29. The rock arm 56 is provided intermediate its ends with a roller cam follower 57 which engages a high-lift quick-acting cam 58 mounted on the shaft 33. It will be noted that the relative proportion of the parts of the mechanisms just described and the relative positions of the pivots provide sufficient leverage that the weight of the rock arms 50, the cross bar 51 and its associated plates 52 is sufficient to assure constant contact between the roller cam follower 57 and its associated cam 58. However, in order to prevent any bouncing of the cam follower 57 against its cam 58 the bearing boss 48 is provided at one end with a flange 59 which receives one end of a coil spring 60, the other end of which is connected to the adjacent rock arm 50. The coil spring 60 thus serves to constantly load the linkage just described to assure constant maintenance of contact between the cam follower 57 and its associated cam. Means are also provided to medially crease a valve sleeve after it has been applied to the flattened upstanding valve lip and fold it down into juxtaposition therewith. By reference to Figs. 13, 14 and 29 it will be seen that these means include a vertically disposed slideway 61 rigidly affixed to associated frame elements and provided with an internal rectangularly cross-sectioned bore 62 having on one lateral wall thereof a rack gear section 63. A vertically reciprocable slide bar 64 is carried within the bore 62 and is provided at its lower end with a roller cam follower 65 which engages with a cam 66 affixed to the shaft 33. A rock arm 67 having a gear-shaped inner end 68 is pivotally connected to the upper end of the slide bar 64 and the gear-shaped end 68 thereof is disposed in meshing engagement with the rack gear section 63. The outer end of the rock arm 67 carries a hollow, arcuately-formed extension 69 terminating in a mounting lug 70 to which a creasing blade 71 is pivotally attached intermediate its ends as at 72.

The upper end of the creasing blade 71 is provided with a short link 73 having one end pivotally connected thereto and its other end connected to an actuating wire 74 which extends through a portion of the arcuate arm extension 69 and has its lower end passing through and extending below a frame member. The lower end of the wire 74 carries a stop collar 75 adjustably affixed thereto. A compression spring 76 surrounds the upper end of the wire 74 and extends between the link 73 and the adjacent end of the arm extension 69 and constantly tends to bias the creasing blade 71 towards the normally inoperative position shown in Fig. 22.

The above described valving mechanisms are operated from the cam shaft 33 which is provided at one end with a sprocket gear 77 carrying an endless sprocket chain 78 engaged with a relatively small diameter sprocket gear 79 affixed to a transversely disposed main drive shaft 80 journalled in a pair of upstanding spaced parallel plates 81, 81 affixed to the base 5, as clearly shown in Fig. 19.

*Sleeving mechanism*

The base 5 is provided with means for supporting a supply roll of paper from which individual sleeves are cut and pasted together with mechanisms for effecting such cutting and pasting operations and for then applying successive sleeves to successively presented opened bag valves. These means include a pair of vertical standards 82 which carry at their edges lugs 83 which rotatably support a supply roll of valve sleeve paper 84. For convenience in reference the individual sleeve blanks to be cut from the supply roll will also be identified by the reference character 84. At the upper end of the standards 82 there is provided a pair of spaced parallel supporting or side plates 85, 85 which carry a pair of upwardly and rearwardly projecting extensions 86, 86 between which is journalled an idler roll 87 on a shaft 88. The lead end of the paper strip from the supply roll 84 thereof passes over the idler 87, thence through the nip formed by a lower draw roll 89 and a spaced pair of upper draw rolls 90, 90, respectively carried by a lower draw roll shaft 91 and an upper draw roll shaft 92 journalled between the plates 85.

From the draw rolls 89 and 90 the paper web passes through the nip formed between a lower cutter roll mounted on a shaft 93 and an upper cutting drum 94 carried by a shaft 95 also journalled between the side plates 85. The cutter drum 94 is provided with an adjustable cutter bar 96 curved as at 97 to form the customary "thumb notch" in one edge of the valve sleeve so that the sleeve can be opened readily when the bag is to be filled by a valve bag filling machine.

After leaving the cutting roll and drum the lead edge of the individual valve sleeve passes through the nip between a female crease roll 98 and a male crease roll 99, respectively carried by upper and lower shafts 100 and 101 journalled between the side plates 85. Operation of the crease rolls is so timed that the valve sleeve blanks are transversely creased near their trailing edge.

The side plates 85, 85 are provided adjacent their lower ends with a pair of upwardly directed extensions 102, 102 between which is affixed a glue or paste pan 103, and the customary fountain roll, transfer roll and rotary paste bar, respectively carried on shafts 104, 105 and 106.

A shaft 107 is journalled between the extensions 102 below the paster shaft 106 and carries a valve sleeve supporting roll 108 having a flattened portion as at 109. The roll 108 is made in two parts in order to provide a centrally disposed transverse groove within which a sprocket gear 110 and bushing or hub 111 are positioned and secured to the shaft. The flat area 109 of the roll 108 cooperates with the paste bar carried by the shaft 106 to apply a bar of paste to the upper trailing edge of the valve sleeve, i. e., beyond the crease formed by the crease rolls 98 and 99. The sprocket gear 110 carries an endless sprocket chain 112 which extends downwardly and to the left as viewed in Figs. 16 and 20 and passes around a second sprocket gear 113 rotatably carried by a mounting plate 114, rigidly affixed between the frame extensions 102. The lower end of the mounting plate 114 is slotted as at 115 in order that an abutment member 116 may be adjustably affixed thereto.

The sprocket chain 112 carries a plurality of sleeve grippers generally indicated at 117 which advance the successively severed flat valve sleeve blanks and maintain control over their movement while the trailing edge portions thereof are being creased by the crease rolls 98 and 99 and pasted by the paste rolls. Each of the grippers includes a flat gripper plate 118 affixed to the chain 112 and a clamp or gripper bar 119 pivotally connected to an adjacent chain pivot as at 120 through a pair of arms 121, 121. The arms 121 are constantly biased toward clamping position by a spring 122 and are each provided with a depending cam lug 123 adapted to contact the bushing 111 about the shaft 107 to open the gripper. After the gripper has been moved far enough by the chain 112 that the cam lugs 123 are removed from contact with the bushing 111 the gripper spring 122 becomes effective to close the gripper over the lead edge of the flat valve sleeve. Each gripper is again opened as the chain advances it to the point where the cam lugs 123 come into contact with the abutment 116 adjacent the lower end of the mounting plate 114. As this occurs the flat valve sleeve carried thereby is removed from its position in the gripper by mechanisms which apply it to the flattened valve of the bag.

All of the foregoing draw, cutting, creasing and pasting rolls are driven from the main drive shaft 80 through a sprocket gear 124 carried on one end thereof, sprocket chain 125 and sprocket gear 126 affixed to one end of the shaft 93. The shafts 93 and 95 are gear connected as are the shafts 100 and 101 which are driven from the shaft 93 through an intermediate gear. The shaft 107 and shafts 104—106 of the paste device are driven from the shaft 100 through an intermediate gear, and it will be observed that the gear ratios are such that the shaft 107 rotates at a greater speed than either of the pairs of shafts 93, 95 or 100, 101 to enable each successively severed valve sleeve to be spaced properly from each succeeding one.

It is, of course, necessary to transfer each valve sleeve from its position overlying the feed chain 112 to a position for application to the opened valve of the associated bag. To this end the plates 81 which are carried by the base 5 in addition to rotatably supporting the main drive shaft 80 carry a transversely extending rod 127 and an adjusting screw 128 having oppositely threaded end portions.

A pair of upstanding side plates 129, 129 each provided with three mounting hubs 130 are slidably carried by the shaft 80 and the rod 127. The central hubs 130 are threadably engaged with the opposite ends of the adjusting screw 128 so that rotation thereof in either direction will cause a corresponding opening or closing of the distance between the plates 129.

Each of the slidably mounted plates 129 is provided at its upper end with a flanged mounting block 131 which supports a stub shaft 132. A sprocket gear 133 is rotatably carried on the stub shaft 132 and positioned immediately inside of the associated plate 129 and is driven from a sprocket gear 134 affixed to the drive shaft 80 by a sprocket chain 135.

Each stub shaft 132 carries a sleeve-applying assembly generally indicated at 136 which includes a pair of spaced parallel arms 137, 137, the inner end of one of which serves as the hub of the sprocket gear 133 and the inner end of the other is provided with a bearing boss 138 rotatably mounted upon the shaft 132. The outer ends of the arms 137 are maintained in spaced relation as by a spacer 139 rigidly connected therebetween so that both arms rotate as a unit when the sprocket gear 133 is driven.

A cam 140 is affixed to the shaft 132 and positioned intermediate the inner ends of the arms 137. A rock arm 141 is pivotally connected as at 142 between the arms 137 and is provided at one end with a roller cam follower 143 which is maintained in contact with the cam 140 and is provided at its other end with a gear sector 144. The gear sector 144 meshes with a gear 145 carried by a shaft 146 journalled in the arms 137. An arm 147 is affixed to one end of the shaft 146 and carries at its outer end a laterally projecting clamp bar 148 which is adapted to be brought into and out of contact with a clamp plate 149 secured across the outer ends of the arms 137 and extending laterally therefrom in an inward direction (see Figs. 19 and 24). The clamp bar 148 together with its associated clamp plate 149 receives and holds each valve sleeve 84 as it is released from the grippers 117 carried by the sprocket chain 112.

The gear 145 meshes with a similar gear 150 mounted on a shaft 151 journalled between the arms 137. An arm 152 has one end secured to the shaft 151 and its other end provided with a tucker blade 153 which normally extends across the outer ends of the arms 137. In order that no free motion of either of the shafts 146 or 151 will take place and in order that the roller cam follower 143 will be maintained in constant contact with the cam 140, a coil spring 154 surrounds the pivot 142 and has one end connected with an adjacent arm 137 and its other end connected to the rock arm 141.

*Operation*

Before describing one compelte cycle of operation of the machine constructed in accordance with this invention it will, of course, be appreciated that the various sprocket gear ratios, the gear train ratios, and the contour and throw of the various cams are all synchronized in properly timed relation.

A valving and sleeving machine as described herein may be supplied with bags either manually or by an automatic bag feeder. In either case a bag support 155 is provided to position the lower edge of the bag at the proper vertical height with respect to the valving and sleeving unit. Similarly, a bag stop or abutment 156 is provided against which the end of the bag becomes positioned in order to properly orient the valve corner thereof with respect to the mechanisms of this machine.

Figure 16:
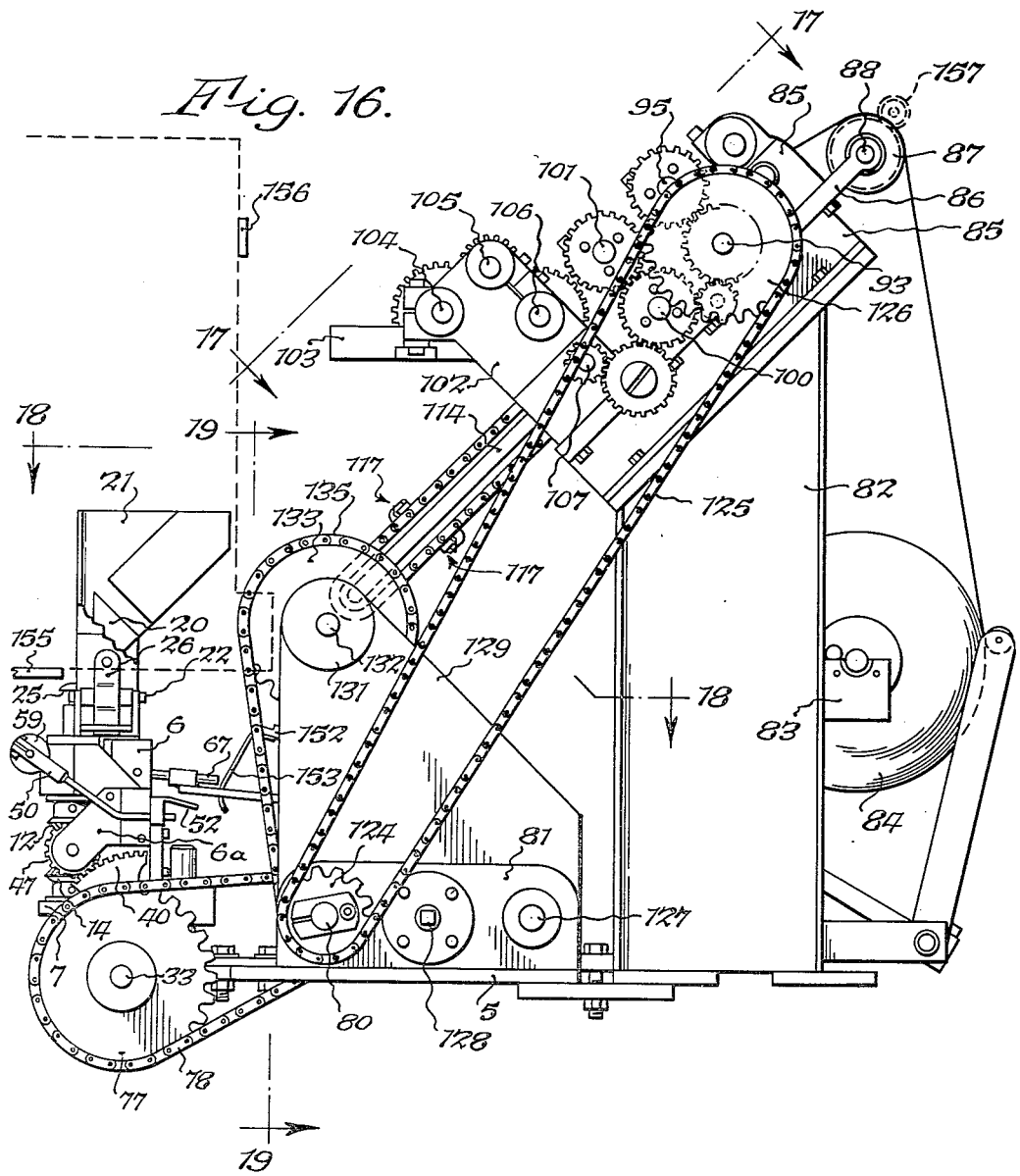
Fig. 16 is a side elevation of a complete valving and sleeving machine constructed in accordance with this invention.

At the start of a cycle of operations a bag is placed on the machine as indicated by dotted lines in Fig. 16 between the wings 21, 21 and with the gusset clamp plates 20 positioned within the gusset. Rotation of the cam shaft 33 will first effect a downward movement of the pull rod 24 under the influence of the cam 34 to move the wing plates 21, 21 into contact with the outer faces of the bag to effect a clamping of the bag walls in cooperation with the gusset clamp plates 20. Continued rotation of the cam shaft 33 will cause the cam 35 to oscillate the yokes 16 and 17 in opposite directions approximately 90° apiece through the driving action of the bevel gears 13, 14 and 12. At this point the valved corner of the bag has become opened to the position indicated in Figs. 6 and 7. Further rotation of the cam shaft 33 causes the cam 58 thereon to oscillate the rock arm 50 through its linkage connections and move the presser plates 52 into contact with the flattened face of the opened valve as shown in Fig. 7 of the drawings.

As these actions of the valving mechanism have been taking place the sleeve feeding and applying mechanisms have been operative to feed a supply of paper from the roll 84 thereof, cut individual sleeve blanks therefrom, transversely crease the sleeve blanks along a line parallel to and near their trailing edges and apply glue to the upper face thereof along the marginal edge portion defined by the crease line and the trailing edge.

As a sleeve blank is moved by the grippers 117 on the chain 112 down towards engagement with the abutment member 116 the sleeve transfer and applying assembly 136 has been moved from the position shown in Fig. 22 towards the position shown in Fig. 24. The clamp plate 149 carried by the arms 137 thereof contacts the underside of the sleeve as it is released by the grippers 117. At the same time the cam 140 mounted on the stub shaft 132 is effective to oscillate the rock arm 141 which causes the arm 147 and its clamp bar 148 to be brought into clamping engagement with the sleeve over the upper surface of the plate 149. Simultaneously, the arm 152 and its associated tucker blade 153 is moved towards the dotted line position also shown in Fig. 24. Continued rotation of the assembly 136 in a counter-clockwise direction will bring the outer end elements thereof to the position indicated in Fig. 28 of the drawings in which the tucker blade 153 first becomes inserted behind the upstanding lip of the valve flap to cause the valve flap to be displaced forward a slight distance in order to provide clearance for the creased marginal edge portion of the sleeve to be inserted therebehind. The underside of the tucker blade 153 also serves as a backing to the marginal edge portion of the sleeve so that it is properly guided into position behind the lip of the valve flap. Continued rotation of the assembly 136 causes the cam 140 to be effective to rapidly move the clamp bar 148 and its associated arm 147 out of clamping engagement relative to the clamp plate 149 so that the valve sleeve is held only over the valve lip of the bag. At the same time the arm 152 and its associated tucker blade 153 undergo relative rotation in a clockwise direction with respect to the arms 137 to enable them to continue their rotation and simultaneously to effect a retraction of the tucker blade from behind the valve lip without imposing any downwardly directed force thereon. It will be noted that the outer end of the clamp plate 149 is convex to provide a smooth curved surface that can drag across or along the outer face of the valve sleeve and to press it towards face to face contact with the valve of the bag again without exerting any substantial downward pull on the sleeve of such a nature as would cause disengagement of the marginal edge portion thereof from behind the upstanding valve lip.

As the arms 137 reach the position shown in Fig. 29 of the drawings it will be noted that the plate 149 is in light contact with the lower portion of the valve sleeve and that the tucker blade 153 has become completely disengaged from any contact with the sleeve or with the bag.

As the parts have reached this position continued rotation of the cam shaft 33 has caused the cam 66 thereon to lift the slide bar 64 and oscillate the rock arm 67 to the position shown in Fig. 29. As the rock arm 67 reaches this position the stop collar 75 on the wire 74 comes into contact with the horizontal frame member as indicated to effect relative movement between the wire and the hollow arm extension 69 whereby to swing the crease blade 71 into the position shown, to form the median crease in the sleeve and to retain control over the downturned sleeve until the opposed wings 21, 21 and their associated gusset clamps 20, 20 have started to fold the valve toward its closed position a degree sufficient that continuance of the valve closing will insure complete folding of the sleeve without causing its misalignment or displacement.

When continuous rotation of the cam shaft 33 again causes the wings 21 to be brought into their initial position as shown in Fig. 31 cam 35 is used to put added creasing force on the valve and the cam 34 again becomes effective to permit a raising of the pull rod 24 and a consequent opening up of the wings 21 into non-clamping position whereupon the completely valved and sleeved bag can be removed.

Figure 17:
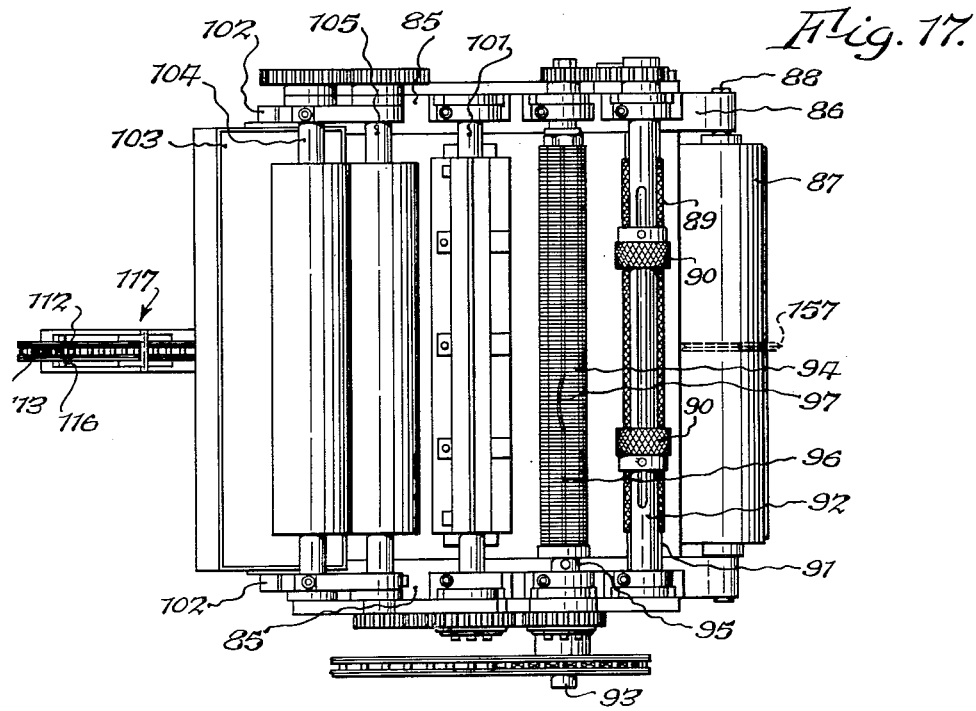
Fig. 17 is a plan view taken along line 17—17 of Fig. 16.
Figure 18:
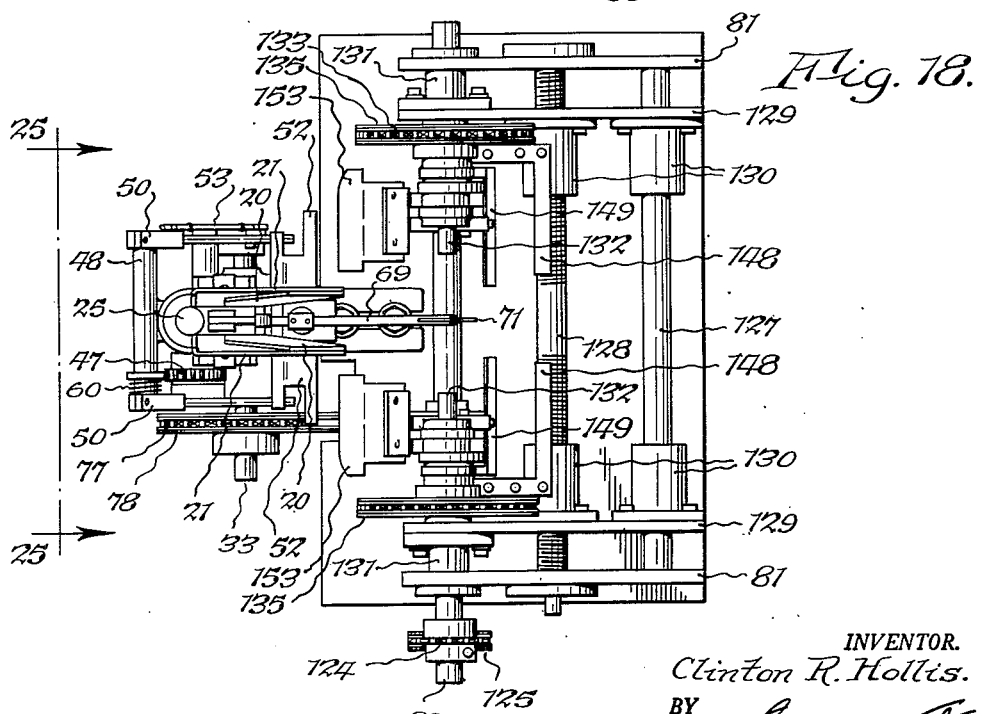
Fig. 18 is a top plan view of the mechanism taken along line 18—18 of Fig. 16.

In some instances where valve sleeves of heavier than normal or stiffer than normal paper is to be used, it may be desirable to medially pre-crease the paper thereof as the individual sleeves are being formed. This can be simply effected by positioning a creasing wheel, shown in dotted lines at 157 on Figs. 16 and 17 of the drawings, at whatever position the crease is to be formed and in order to form in the roll 87 a shallow mating groove in order that the crease may be readily effected. The supplemental creasing means should not normally be employed where sleeves of relatively lightweight, flexible paper are to be applied to valve bags.

It is, of course, to be understood that various details of arrangements and proportions of parts may be modified within the scope of the appended claims.

I claim:

1. A machine for automatically forming valves in gusseted paper bags and for forming and applying sleeve inserts thereto, including: means for supporting a bag in position at a single location for valving and sleeving operations, means for forming an opened valve by folding the bag walls apart to effect infolding of the valve-forming portion at a corner of the bag with the infolded material lying in a single plane substantially at right angles to the longitudinal axis of the bag with the edge of the valve lip forming a substantially straight line, means for drawing, cutting, transversely creasing, pasting and conveying valve sleeve insert blanks, means for removing each successive insert blank from the conveying devices of said last-named means and for inserting the trailing edge thereof behind the upstanding lip of the opened bag valve, press means temporarily positioned against the face of the bag valve below the lip thereof each time a sleeve blank is to be inserted therebehind to maintain the valve in its flattened position, said removing and inserting means also being effective to move the leading portion of the insert blank towards contact with the face of the valve, and means to medially crease said blank while moving the leading portion thereof into full contact with the face of the bag valve as said valve-forming means become effective to close the formed and sleeved valve, said valve-forming means being effective to apply final creasing pressure to the formed and sleeved valve immediately after the same has been fully closed.

2. A machine for automatically forming valves in gusseted paper bags and for forming and applying sleeve inserts thereto, including: means for supporting a bag in position at a single location for valving and sleeving operations, means for forming an opened valve by folding the bag walls apart to effect infolding of the valve-forming portion at a corner of the bag with the infolded material lying in a single plane substantially at right angles to the longitudinal axis of the bag with the edge of the valve lip forming a substantially straight line, continuously operable means for drawing, cutting, transversely creasing, pasting and conveying valve sleeve insert blanks, continuously operable means for removing each successive insert blank from the conveying devices of said last-named means and for inserting the trailing edge thereof behind the upstanding lip of the opened bag valve, press means temporarily positioned against the face of the bag valve below the lip thereof each time a sleeve blank is to be inserted therebehind to maintain the valve in its flattened position, said removing and inserting means being also effective to move the leading portion of the insert blank towards contact with the face of the valve, and means to medially crease said blank while moving the leading portion thereof into full contact with the face of the bag valve as said valve-forming means become effective to close the formed and sleeved valve, said valve-forming means being effective to apply final creasing pressure to the formed and sleeved valve immediately after the same has been fully closed.

3. A machine for automatically forming valves in gusseted paper bags and for forming and applying sleeve inserts thereto, including: means for supporting a bag in position at a single location for valving and sleeving operations, means for forming an opened valve by folding the bag walls apart to effect infolding of the valve-forming portion at a corner of the bag with the infolded material lying in a single plane substantially at right angles to the longitudinal axis of the bag with the edge of the valve lip forming a substantially straight line, continuously operable means for drawing, cutting, transversely creasing, pasting and conveying valve sleeve insert blanks, continuously operable rotary means for removing each successive insert blank from the conveying devices of said last-named means and for inserting the trailing edge thereof behind the upstanding lip of the opened bag valve, press means temporarily positioned against the face of the bag valve below the lip thereof each time a sleeve blank is to be inserted therebehind to maintain the valve in its flattened position, said removing and inserting means being also effective to move the leading portion of the insert blank towards contact with the face of the valve, and means to medially crease said blank while moving the leading portion thereof into full contact with the face of the bag valve as said valve-forming means become effective to close the formed and sleeved valve, said valve-forming means being effective to apply final creasing pressure to the formed and sleeved valve immediately after the same has been fully closed.

4. In a machine of the character described wherein is provided means for forming in a stationarily positioned gusseted paper bag an opened valve including a valve lip disposed substantially at right angles to the longitudinal axis of the bag, and sleeve-producing means spaced from said valve-forming means for drawing, cutting, transversely creasing, pasting and conveying valve sleeve insert blanks: the combination of continuously operating rotary means interposed between said valve-forming and said sleeve-producing means for removing each successive insert blank from said sleeve-producing means and for inserting the trailing edge thereof behind the upstanding lip of the opened bag valve, and press means temporarily positioned against the face of the opened bag valve below the lip thereof each time a sleeve blank is to be inserted therebehind to maintain the valve in a flattened position.

5. In a machine of the character described wherein is provided means for forming in a stationarily positioned gusseted paper bag an opened valve including a valve lip disposed substantially at right angles to the longitudinal axis of the bag, and sleeve-producing means spaced from said valve-forming means for drawing, cutting, transversely creasing, pasting and conveying valve sleeve insert blanks: the combination of continuously operating rotary means interposed between said valve-forming and said sleeve-producing means for removing each successive insert blank from said sleeve producing means and for inserting the trailing edge thereof behind the upstanding lip of the opened bag valve, press means temporarily positioned against the face of the opened bag valve below the lip thereof each time a sleeve blank is to be inserted therebehind to maintain the valve in a flattened position, said continuously operating rotary means being also effective to move the leading portion of the insert blank towards contact with the face of the opened valve, and means to medially crease said insert blank while moving the leading portion thereof into full contact with the face of said opened bag valve as said valve-forming means become effective to close the formed and sleeved valve.

6. In a machine of the character described wherein is provided means for forming in a gusseted paper bag an opened valve including a valve lip disposed substantially at right angles to the longitudinal axis of the bag, and sleeve producing means spaced from said valve-forming means for drawing and cutting valve sleeve insert blanks; the combination of continuously operating conveyor means engageable with the lead edge of each successively cut valve sleeve blank for moving said blanks through creasing and pasting devices into position for transfer to the opened bag valve, means for transversely creasing each valve sleeve blank adjacent its trailing edge, means for applying paste to the creased trailing marginal edge portion of said valve sleeve blank, continuously operating rotary means interposed between said valve-forming and said sleeve-producing means engageable with the lead portion of each successive sleeve blank for removing the blank from said conveyor means and for inserting the creased trailing edge portion thereof behind the upstanding lip of the opened bag valve, and cyclically operable press means temporarily positioned against the face of the opened bag valve below the lip thereof to maintain the valve in its flattened position each time the trailing edge portion of a sleeve blank is to be inserted therebehind by said rotary means.

7. In a machine of the character described wherein is provided means for forming in a gusseted paper bag an opened valve including a valve lip disposed substantially at right angles to the longitudinal axis of the bag, and sleeve-producing means spaced from said valve-forming means for drawing and cutting valve sleeve insert blanks; the combination of continuously operating conveyor means engageable with the lead edge of each successively cut valve sleeve blank for moving said blanks through creasing and pasting devices into position for transfer to the opened bag valve, means for transversely creasing each valve sleeve blank adjacent its trailing edge, means for applying paste to the creased trailing marginal edge portion of said valve sleeve blank, and continuously operating rotary means interposed between said valve-forming and said sleeve-producing means engageable with the lead portion of each successive sleeve blank for removing the blank from said conveyor means and for inserting the creased trailing edge portion thereof behind the upstanding lip of the opened bag valve, said rotary means including a rotary arm to which is affixed a laterally extending clamp plate, a clamp arm pivotally connected to said rotary arm and oscillatable with respect thereto to clamp and release the leading portion of each successively presented sleeve blank, a second arm pivotally connected to said rotary arm and oscillatable with respect thereto in opposition to said clamp arm and carrying at its outer end a laterally extending tucker blade engageable across the creased trailing edge of the sleeve blank, and cam, cam follower and gear connections for effecting properly timed oscillation of said clamp and second arms during rotation of said rotary arm.

8. In a machine of the character described wherein is provided means for forming in a gusseted paper bag an opened valve including a valve lip disposed substantially at right angles to the longitudinal axis of the bag, and sleeve-producing means spaced from said valve-forming means for drawing and cutting valve sleeve insert blanks; the combination of continuously operating conveyor means engageable with the lead edge of each successively cut valve sleeve blank for moving said blanks through creasing and pasting devices into position for transfer to the opened bag valve, means for transversely creasing each valve sleeve blank adjacent its trailing edge, means for applying paste to the creased trailing marginal edge portion of said valve sleeve blank, continuously operating rotary means interposed between said valve-forming and said sleeve-producing means engageable with the lead portion of each successive sleeve blank for removing the blank from said conveyor means and for inserting the creased trailing edge portion thereof behind the upstanding lip of the opened bag valve, said rotary means including a rotary arm to which is affixed a laterally extending clamp plate, a clamp arm pivotally connected to said rotary arm and oscillatable with respect thereto to clamp and release the leading portions of successively presented sleeve blanks, a second arm pivotally connected to said rotary arm and oscillatable with respect thereto in opposition to said clamp arm and carrying at its outer end a laterally extending tucker blade engageable across the creased trailing edge of the sleeve blanks, and cam, cam follower and gear connections for effecting properly timed oscillation of said clamp and second arms during rotation of said rotary arm, and cyclically operable press means temporarily positioned against the face of the opened bag valve below the lip thereof to maintain the valve in its flattened position each time the trailing edge portion of a sleeve is to be inserted therebehind by said rotary means.

9. In a machine of the character described wherein is provided means for forming in a gusseted paper bag an opened valve including a valve lip disposed substantially at right angles to the longitudinal axis of the bag, and sleeve-producing means spaced from said valve-forming means for drawing and cutting valve sleeve insert blanks; the combination of continuously operating conveyor means engageable with the lead edge of each successively cut valve sleeve blank for moving said blanks through creasing and pasting devices into position for transfer to the opened bag valve, means for transversely creasing each valve sleeve blank adjacent its trailing edge, means for applying paste to the creased trailing marginal edge portion of said valve sleeve blank, continuously operating rotary means interposed between said valve-forming and said sleeve-producing means engageable with the lead portion of each successive sleeve blank for removing the blank from said conveyor means and for inserting the creased trailing edge portion thereof behind the upstanding lip of the opened bag valve, said rotary means including a rotary arm to which is affixed a laterally extending clamp plate, a clamp arm pivotally connected to said rotary arm and oscillatable with respect thereto to clamp and release the leading portions of successively presented sleeve blanks, a second arm pivotally connected to said rotary arm and oscillatable with respect thereto in opposition to said clamp arm and carrying at its outer end a laterally extending tucker blade engageable across the creased trailing edge of the sleeve blanks, and cam, cam follower and gear connections for effecting properly timed oscillation of said clamp and second arms during rotation of said rotary arm, cyclically operable press means temporarily positioned against the face of the opened bag valve below the lip thereof to maintain the valve in its flattened position each time the trailing edge portion of a sleeve is to be inserted therebehind by said rotary means, said continuously operating rotary means being also effective to move the leading portion of the sleeve blank towards contact with the face of the opened valve, and means to medially crease said sleeve blank while moving the leading portion thereof into full contact with the face of said opened bag valve as said valve-forming means become effective to close the formed and sleeve valve.

10. In a machine of the character described wherein is provided means for forming a valve in a corner of a bag tube and means spaced from the valve-forming means for producing valve insert sleeve blanks: the combination of a continuously operating endless conveyor chain having one end loop located adjacent the sleeve blank-producing means and its other end loop extending toward said valve-forming means, a plurality of grippers carried by said conveyor chain, means to feed successive sleeve blanks toward said conveyor chain for engagement by a gripper, means to open and close said gripper about the leading edge of said sleeve blank whereby to move the same in the direction of said valve-forming means, separate means to again open and close said gripper to release said sleeve blank, and continuously operating rotary means interposed between said conveyor chain and said valve-forming means and engageable with the lead portion of each said sleeve blank for removing the blank from said conveyor gripper and for inserting he trailing edge portion thereof behind the upstanding lip of the opened bag valve.

11. In a machine of the character described wherein is provdied means for forming a valve in a corner of a bag tube and means spaced from the valve-forming means for producing valve insert sleeve blanks: the combination of a continuously operating endless conveyor chain having one end loop located adjacent the sleeve blank-producing means and its other end loop extending toward said valve-forming means, a plurality of grippers carried by said conveyor chain, means to feed successive sleeve blanks toward said conveyor chain for engagement by a gripper, means to open and close said gripper about the leading edge of said sleeve blank whereby to move the same in the direction of said valve-forming means, separate means to again open and close said gripper to release said sleeve blank, and continuously operating rotary means interposed between said conveyor chain and said valve-forming means and engageable with the lead portion of each said sleeve blank for removing the blank from said conveyor gripper and for inserting the trailing edge portion thereof behind the upstanding lip of the opened bag valve, said rotary means including a rotary arm to which is affixed a laterally extending clamp plate, a clamp arm pivotally connected to said rotary arm and oscillatable with respect thereto to clamp and release the leading portion of each successively presented sleeve blank, a second arm pivotally connected to said rotary arm and oscillatable with respect thereto in opposition to said clamp arm and carrying at its outer end a laterally extending tucker blade engageable across the trailing edge portion of the sleeve blank, and cam, cam follower and gear connections for effecting properly timed oscillation of said clamp and second arms during rotation of said rotary arm.

References Cited in the file of this patent

UNITED STATES PATENTS

| | | |
|---|---|---|
| 2,559,873 | Grupe et al. | July 10, 1951 |
| 2,643,588 | Burroughs | June 30, 1953 |
| 2,677,319 | Potdevin | May 4, 1954 |